United States Patent [19]

Soleau, Jr.

[11] 4,344,824
[45] Aug. 17, 1982

[54] RECIRCULATING NATURAL CONVECTION SOLAR STILL

[76] Inventor: Bertrand S. Soleau, Jr., 4203 Kincaid Ct., Chantilly, Va. 22021

[21] Appl. No.: 163,523

[22] Filed: Jun. 27, 1980

[51] Int. Cl.³ .......................... B01D 3/00; F24J 3/02; C02B 1/04
[52] U.S. Cl. .................................. 202/234; 203/49; 203/DIG. 1
[58] Field of Search .................. 203/49, DIG. 1; 202/234, 163; 165/48 S

[56] References Cited
U.S. PATENT DOCUMENTS 4,203,805  5/1980  Diggs .................................. 202/234

*Primary Examiner*—Frank Sever
*Attorney, Agent, or Firm*—Robert W. Carlson

[57] ABSTRACT

The disclosed invention is a solar still utilizing recirculating air driven by natural convection to evaporate pure water from saline water. The pure water evaporated into the air is removed by a condenser and the condenser also cools the air thereby causing its density to increase. The air density difference within the still, due to temperature differences, causes the air to flow in the desired pattern. This natural convection may be augmented by a fan or fans, if desired, to increase the output of the still. The same air is continuously circulated thereby reducing the thermal losses that occur when moist air is removed from the still. A recirculating pump is the only mechanical device required when the still is in the natural convection mode of operation.

6 Claims, 3 Drawing Figures

RECIRCULATING NATURAL CONVECTION SOLAR STILL

BACKGROUND OF THE INVENTION

This invention relates to solar stills and more particularly to solar stills that utilize recirculating air driven by natural convection.

In some parts of the world sea water (salt water) is abundant whereas fresh water is a very scarce commodity. Therefore, a great deal of effort and money has been spent to develop efficient systems for converting salt water to fresh water. Most if not all of the old conventional methods of convecting salt water to fresh water are highly inefficient and expensive.

In more recent years, efforts to utilize solar energy for converting salt water to fresh water have increased and various different types of solar stills have been developed. However, in so far as this applicant is aware, no solar still utilizing air flow driven by natural convection has been devised prior to this invention.

The solar still of this invention utilizes recirculating air driven by natural convection to evaporate fresh water from saline water. Except for a recirculating pump, the solar still of this invention, in the preferred embodiment, has no mechanically moving elements and therefore except for the energy needed to drive the pump relies solely on solar energy.

SUMMARY OF THE INVENTION

The apparatus of this invention functions as a solar still which utilizes recirculating air driven by natural convection to evaporate pure water from saline water. In the preferred embodiment the solar still if this invention includes a first section that is oriented horizontally and a second section, oriented at an angle with to the horizontal which communicates with the first section.

The first section which is covered by a transparent plate of glass or plastic houses the source of saline water, an evaporator and pure water collector. The second section which is also covered by a transparent plate of glass or plastic houses the solar absorber and an air flow separator plate. The entire still is, of course, formed as a closed, nearly hermeticaly sealed housing.

Air cooled by the condenser flows downward in the still and then as it is heated by solar energy, the air flows upward over the solar absorber plate and surface of the saline water. As the heated air which has a relatively low humidity flows over the saline water, water is evaporated into the air thereby increasing its relative humidity and decreasing its temperature. The humid air than flows over the condenser which cools the air and causes the pure water to condense from the air. A collector for the pure water is provided below the condenser. The air is cooled by the saline water which is circultated through the still. The air cooled by the condenser then flows downward through the still and back up across the solar absorber to be re-heated. This air flow is driven by the natural convection caused by the heating and cooling of the air. Although, not preferred, a fan or fans may be used to augment the air flow and increase the output of the still.

BRIEF DESCRIPTION OF THE DRAWING

A complete understanding of the invention can be obtained from the following detailed description when read in conjunction with the annexed drawing in which.

DETAILED DESCRIPTION

Figure 1:
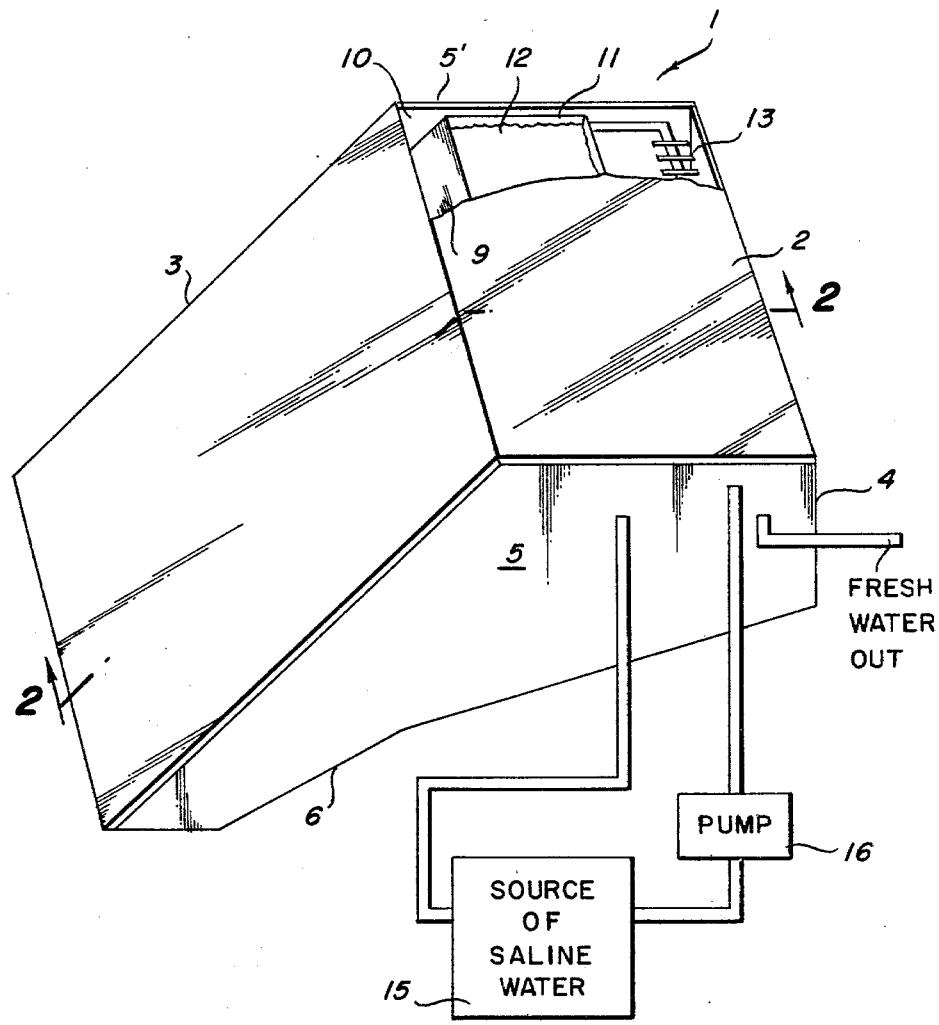
FIG. 1 is a plan view showing the external configuration of the invention.

Referring to FIG. 1, this Figure illustrates the overall configuration of the preferred embodiment of the solar still 1 of this invention. Solar still 1 includes a first transparent cover plate 2 (partially broken away) and a second transparent cover plate 3. A back wall 4, an end walls 5 and 5' and a bottom wall as floor 6. Transparent plates 1 and 2, all the walls and the floor are joined together to form an air tight enclosure. Transparent cover plate 2 is oriented horizontally while transparent cover plate 3 is inclined at an angle to the horizontal to (as will become apparent) maximize the solar intercept area for heating. Both transparent plates 1 and 2 can be made of glass or of a suitable plastic material. The floor 6 and all the walls are fabricated out of any suitable material that is a heat insulator or of any suitable material with heat insulating material such as foam secured against the inside or outside of the walls and the floor.

Figure 2:
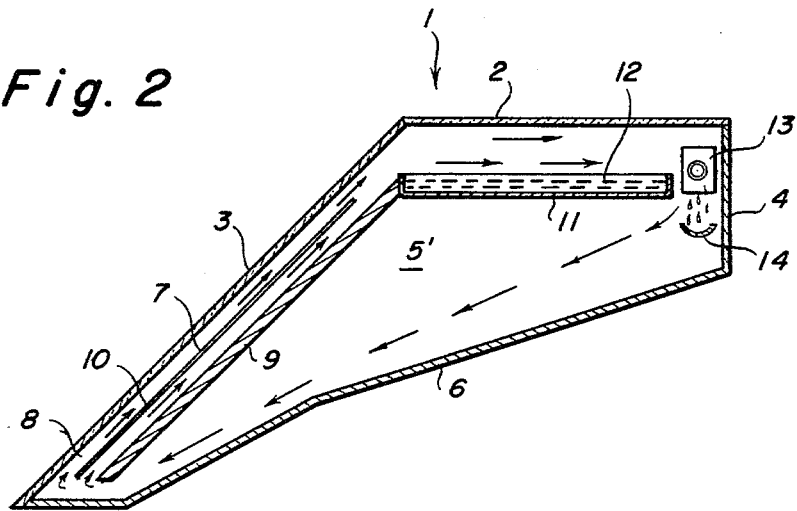
FIG. 2 is a cross-section view of the embodiment of FIG. 1 taken along the line 2—2.

Referring now to FIG. 2, this Figure has the elements of still 1 that are housed inside the still. A solar absorber plate 7 is located beneath transparent plate 3. Solar absorber plate 3 may be a black foil solar absorber plate. An air flow channel 8 is formed between the inside surface of transparent plate 3 and the top surface of solar absorber plate 7. An air flow separator 9 is located below solar absorber plate 7 and spaced apart from the solar absorber 7 such that an air flow channel 10 is formed between air flow separator 9 and solar absorber plate 7. A trough or channel 11 which contains the saline solution 12 is located below transparent plate 2. The bottom of channel 11 is black to absorb incident solar energy thereby raising the temperature of saline water 12.

A condenser 13 which is preferably a finned tube heat exchanger is located to the right of channel 11. As will be described later herein, saline water 12 is pumped through the center tube of condenser 13. A fresh water trough 14 is located below condenser 13.

Referring now to FIGS. 1 and 2, FIG. 1 shows a source of saline water 15 which may be a storage tank containing saline water 12 or may be a body of salt water. The saline water 12 is pumped by means of the pump 16, through the tube of condenser 13, through channel 11 and back to source 15. The cut away portion of transparent plate 2 in FIG. 1 shows that the tube of condenser 13 is coupled to trough 11 by means of the pipe or tube 18.

The fresh water 17 which is collected in trough 14 is extracted from still 1 by means of the pipe 19 which communicates with trough 14. Trough 14 is preferably on an incline so that fresh water flow out of still 1 is by gravity flow. However, a pump could be used to pump fresh water 14 out of still 1. Pipe 19 is coupled to either the point of use or to a storage tank.

The arrows in FIG. 2 represent the direction of air flow through still 1. Cool air from condenser 13, at 100% relative humidity, flows downward trough still 1 and enters channels 8 and 10. The air in channels 8 and 10 is heated by solar absorber plate 7 which is heated by solar energy. Air flow separator 9 prevents premature contact of the cool air with hot absorber plate 7. Solar absorber 6 and transparent plate 3 are preferably inclined as shown in FIGS. 1 an 2 to maximize the solar intercept area and to facilitate the natural convection flow of the air.

The heated, low relative humidity, air enters the area of still 1 between transparent plate 2 and the top surface of saline water 12. Fresh water from saline water 12 is evaporated into the moving, hot, low relative humidity air thereby decreasing its temperature and increasing its relative humidity. Since the bottom of trough 11 is black, it absorbs the incident solar energy and heats saline water 12 thereby further enhancing the evaporation process. The air now saturated with moisture, enters the area of condenser 13 which is cooled by the saline water 12 which flows through condenser 13 before it enters trough 11. The latent heat of vaporization given up by the condensed moisture, preheats saline water 12 before it enters trough 11.

Condenser 13 cools the moist air and pure water 17 condenses out to a degree commenaurate with its saturation humidity at the temperature at which it leaves condenser 13. The condensate (pure water 17) is collected in trough 14 and transported by means of pipe 19 to a storage tank or to the point of use. The cooled air now flows downward through still 1 and upward over and under absorber plate 7 to be heated again. Thus, the air continuously flows through still 1 by natural convection.

Figure 3:
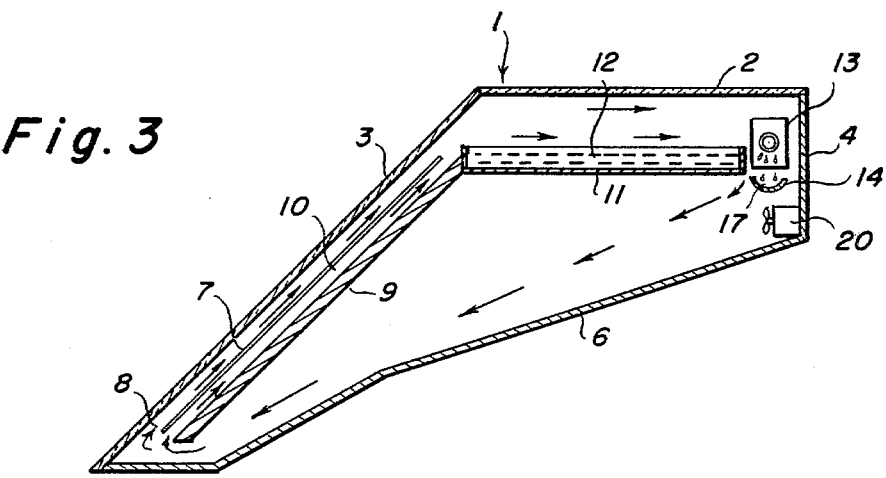
FIG. 3 is a cross-section view identical to the cross-section view of FIG. 2 with an optional fan added to the preferred embodiment.

FIG. 3 is a cross-section view identical to FIG. 2 except that the fan 20 has been added to solar still 1. In all other respects the structure of FIG. 3 is identical to the structure in FIG. 2 and like parts in the two figures have identical numerals. As stated previously, fan 20 is optional and the preferred embodiment is the natural convection flow embodiment of FIG. 2. Fan 20 does augment the natural convection flow of the air and use of a fan or fans well increase the output of still 1 but the use of a fan or fans does expend additional energy.

From the foregoing description, it should be apparent that the solar still of this invention provides a relatively inexpensive method of obtaining fresh water from saline water. The latent heat of vaporization is utilized to preheat the incoming saline water and not rejected to the atmosphere as in other solar stills. The saline water is evaporated to a predetermined salt content and piped from the still before it becomes saturated with salt to eliminate salt precipitation in the still. The sensible heat in this outgoing highly saline solution may be transferred to the incoming saline solution with a shell and tube heat exchanger. A similar heat exchanger may be employed to recover heat from the exiting pure water and transfer it to the incoming saline water. Other than solar energy, the only energy source required to operate the still of this invention is the energy needed to operate the circulating pump. If a fan or fans are used these devises will also have to be energized and for this reason the use of a fan or fans is not preferred.

While the invention has been shown and described with reference to a preferred embodiment and a variation of the preferred embodiment, it will be apparent to those skilled in this art that various changes and modificatins can be made to the preferred embodiment without departing from the spirit and scope of the invention as set forth in the claims. For example, transparent plates 2 an 3 may be a single transparent plate that is bent.

What is claimed is:

1. A solar still comprising means for defining a natural recirculating air convection loop including means for heating relatively dry air comprising a heat absorber means positioned between a first angularly disposed transparent plate and an air partition means; means for providing relatively moist air from said relatively dry air comprising a horizontally disposed transparent plate positioned over a first trough for containing saline water; and means for removing moisture from said relatively moist air to provide said relatively dry air, comprising a condenser means positioned over a second trough for collecting condensed moisture.

2. A recirculating natural convection solar still as defined in claim 1 wherein a pump circulates saline water from a source of saline water through said condenser means and into said trough.

3. A recirculating natural convection solar still as defined in claim 16 wherein means are provided for extracting fresh water from said still.

4. A recirculating natural convection solar still as defined in claim 3 wherein means are provided for extracting the concentrated saline residual solution from said still.

5. A recirculating natural convection solar still as defined in claim 4 wherein heat exchangers are provided to transfer heat from saline and fresh water exiting the still to the incoming saline water.

6. A recirculating natural convection solar still as defined in claim 5 wherein at least one fan used to augment said natural convection flow of said air through said still is housed in said still.

* * * * *